(12) United States Patent
Ishibe

(10) Patent No.: US 6,239,894 B1
(45) Date of Patent: May 29, 2001

(54) SCANNING OPTICAL SYSTEM AND IMAGE FORMING APPARATUS USING THE SAME

(75) Inventor: Yoshihiro Ishibe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/346,679

(22) Filed: Jul. 2, 1999

(30) Foreign Application Priority Data

Jul. 6, 1998 (JP) .................................................. 10-205903

(51) Int. Cl.$^7$ .................................................. G02B 26/08
(52) U.S. Cl. .......................... 359/205; 359/206; 359/207; 359/216; 359/217
(58) Field of Search .................................. 359/205, 206, 359/207, 216, 217, 218, 219

(56) References Cited

U.S. PATENT DOCUMENTS

| | | | |
|---|---|---|---|
| 5,710,654 | * | 1/1998 | Ota .................................. 359/205 |
| 5,777,774 | * | 7/1998 | Iizuka ................................ 359/208 |
| 5,805,323 | * | 9/1998 | Ichikawa ............................ 359/205 |
| 5,861,978 | * | 1/1999 | Kamikubo ........................... 359/207 |
| 5,900,964 | * | 5/1999 | Iizuka ................................ 359/207 |
| 5,940,200 | * | 8/1999 | Iizuka ................................ 359/206 |
| 5,963,356 | * | 10/1999 | Kato .................................. 359/216 |

FOREIGN PATENT DOCUMENTS

| | | |
|---|---|---|
| 6-18800 | | 1/1994 (JP) . |
| 6018800A | * | 1/1994 (JP) . |
| 7-27991 | | 1/1995 (JP) . |
| 7027991A | * | 1/1995 (JP) . |
| 9-230274 | | 9/1997 (JP) . |

* cited by examiner

Primary Examiner—Cassandra Spyrou
Assistant Examiner—Leo Boutsikaris
(74) Attorney, Agent, or Firm—Fitzpatrick, Cella, Harper & Scinto

(57) ABSTRACT

A scanning optical system includes a first optical system for shaping a light beam emitted from a light source to form a line image elongated in the same direction as a main scanning direction, a light deflector which has a deflection surface near an imaging position of the first optical system and deflectively scans an incident light beam in the main scanning direction, a second optical system for forming the light beam deflected by the light deflector into an image on a scanned surface in the main scanning direction, and a third optical system for forming the light beam deflected by the light deflector into an image on the scanned surface in a sub-scanning direction and setting the deflection surface of the light deflector and the scanned surface optically conjugate with each other. The light beam guided by the first optical system is made to strike the light deflector at a predetermined angle with respect to a plane perpendicular to a rotation axis of the light deflector. An optical axis of the second optical system is set to be parallel to a plane which includes an imaging point of the line image and is perpendicular to the rotation axis of the light deflector, and is also set to shift from a plane, which includes the imaging point of the line image and is perpendicular to the rotation axis of the light deflector, by a predetermined amount in the sub-scanning direction.

28 Claims, 10 Drawing Sheets

SCANNING OPTICAL SYSTEM AND IMAGE FORMING APPARATUS USING THE SAME

BACKGROUND OF THE INVENTION

1. Field of the Invention

The present invention relates to a scanning optical system and an image forming apparatus using the same and, more particularly, to a scanning optical system suited to an apparatus, such as a laser beam printer (LBP) or digital copying machine, which makes the light beam emitted from a light source means strike a light deflector at a predetermined angle with respect to a plane perpendicular to the rotation axis of the light deflector, deflects the light beam, and scans it on a scanned surface, thereby recording image information.

2. Description of the Related Art

Various scanning optical systems are disclosed in, for example, Japanese Patent Application Laid-Open Nos. 6-18800, 7-27991, and 9-230274, which make the light beam emitted from a light source means strike a polygon mirror as a light deflector at a predetermined angle with respect to a plane perpendicular to the rotation axis of the light deflector, deflect/reflect the light beam, and scan it on a scanned surface, thereby recording image information.

According to Japanese Patent Application Laid-Open No. 6-18800, in the scanning optical system which makes the light beam emitted from the light source means strike the polygon mirror at a predetermined angle with respect to a plane perpendicular to the rotation axis of the polygon mirror, deflectively reflects the light beam, and scans it on a scanned surface through a scanning lens, thereby recording image information, a post objective optical system is disclosed, in which a main scanning cross-section of a deflection surface (polygon surface) of the polygon mirror has an elliptic shape, and the scanning lens is displaced in the sub-scanning direction (a direction perpendicular to a main scanning plane which is a plane scanned by the light beam deflectively reflected by the polygon mirror).)

According to Japanese Patent Application Laid-Open No. 7-27991, in the scanning optical system which makes the light beam emitted from the light source means strike the polygon mirror at a predetermined angle with respect to a plane perpendicular to the rotation axis of the polygon mirror, deflects/reflects the light beam, and scans it on a scanned surface through a scanning lens, thereby recording image information, a post objective optical system is disclosed, in which a main scanning cross-section of the polygon mirror has an elliptic shape, and only the incident surface of the scanning lens is shaped to be displaced in the sub-scanning direction.

According to Japanese Patent Application Laid-Open No. 9-230274, in the scanning optical system which makes the light beam emitted from the light source means strike the polygon mirror at a predetermined angle with respect to a plane perpendicular to the rotation axis of the polygon mirror, deflectively reflects the light beam, and scans it on a scanned surface through a cylindrical lens or cylindrical mirror, thereby recording image information, an optical system is disclosed, in which the cylindrical lens or cylindrical mirror is positioned to make the light beam to be incident on the cylindrical lens or cylindrical mirror it at a predetermined height away from the generating-line thereof.

However, various problems are posed in the above-described conventional scanning optical systems, as described below.

The scanning optical system disclosed in Japanese Patent Application Laid-Open No. 6-18800 is the post objective optical system in which the light beam emitted from the light source strikes the polygon mirror at a predetermined angle with respect to a plane perpendicular to the rotation axis of the polygon mirror, and the light beam is incident on the polygon mirror from the center in the deflection angle of the polygon mirror in the main scanning direction. A main scanning cross-section of a deflection surface of the polygon mirror is formed into an elliptic shape, and the scanning lens is displaced in the sub-scanning direction, thereby correcting any deformation of the spot shape while correcting fθ characteristics and curvature of field.

In an optical system using such an incidence method, i.e., a so-called sub-scanning oblique incident optical system, the surface formed by the light beam deflectively reflected by the deflection surfaces does not become a plane but becomes a conical surface like the one shown in FIG. 11. When such a light beam strikes the scanning lens, the light beam incident positions shift from each other on the central portion and two end portions of the lens in the sub-scanning direction. In this reference, the resultant spot shape deformation is corrected by displacing the scanning lens in the sub-scanning direction from a plane which includes the light beam deflectively reflected by the polygon mirror and is parallel with the main scanning plane.

In this reference, however, since the scanning lens is relatively near the scanned surface and far from a deflection surface, the shifting amount of the light beam incident positions in the sub-scanning direction on the scanning lens surface becomes large. This makes it difficult to properly correct any deformation of the spot shape only by displacing the scanning lens in the sub-scanning direction.

In addition, since the scanning lens described in this reference has a relatively strong power in the sub-scanning direction, when the scanning lens is displaced in the sub-scanning direction, the spot shape deteriorates in the sub-scanning direction. That is, spot shape deformation is not satisfactorily corrected.

In the scanning optical system disclosed in Japanese Patent Application Laid-Open No. 7-27991, to solve the same problem as described above, only the incident surface of the scanning lens is shaped to be displaced in the sub-scanning direction. In this case, however, since aberrations other than fθ characteristics are properly corrected, scarifying the fθ characteristics, the fθ characteristics are corrected by continuously changing the oscillation timing of the semiconductor laser.

If, however, such a correction is simply performed, since the scanning speed on the scanned surface is not constant, the amount of light on the scanned surface varies. If the emission time is continuously changed as well as the oscillation timing to keep the amount of light uniform, the apparent spot diameter changes in the main scanning direction. This makes it difficult to obtain good optical performance.

According to Japanese Patent Application Laid-Open No. 9-230274, curvature of field is corrected by positioning the cylindrical lens or cylindrical mirror to make a light beam strike the cylindrical lens or cylindrical mirror at a predetermined height away from the generating-line thereof. However, no consideration is given to the above spot shape deformation. In addition, in a scanning optical system having an arrangement like the one disclosed in the reference, satisfactory optical performance cannot be obtained only by simply correcting curvature of field alone, because spot shape deformation like the one descried above occurs.

SUMMARY OF THE INVENTION

It is an object of the present invention to provide a scanning optical system which can effectively correct spot shape deformation caused in a sub-scanning oblique incident optical system by optimally setting the shapes, configuration, and the like of elements building the optical scanning system, and can properly correct both fθ characteristics and curvature of field, and an image forming apparatus using the same.

A scanning optical system of the present invention comprises:

a first optical system for shaping a light beam emitted from light source means to form a line image elongated in the same direction as a main scanning direction;

a light deflector which has a deflection surface near an imaging position of the first optical system and deflectively scans an incident light beam in the main scanning direction;

a second optical system for forming the light beam deflected by the light deflector into an image on a scanned surface in the main scanning direction; and a third optical system for forming the light beam deflected by the light deflector into an image on the scanned surface in a sub-scanning direction and setting the deflection surface of the light deflector and the scanned surface conjugate with each other, and is characterized in that the light beam guided by the first optical system is made to strike the light deflector at a predetermined angle with respect to a plane perpendicular to a rotation axis of the light deflector, and an optical axis of the second optical system is set to be parallel to a plane which includes an imaging point of the line image and is perpendicular to the rotation axis of the light deflector, and is also set to shift from a plane, which includes the imaging point of the line image and is perpendicular to the rotation axis of the light deflector, by a predetermined amount in the sub-scanning direction.

In addition, the scanning optical system of the present invention is characterized in that the light beam incident on the light deflector is incident from a substantially center in a deflection angle of the light deflector, the light beam emerging from the first optical system is incident on the light deflector with a width of the light beam exceeding a width of the deflection surface of the light deflector in the main scanning direction, the second optical system is located closer to the light deflector than a middle position in a distance from the light deflector to the scanned surface, a shape of a sub-scanning cross-section of the second optical system is formed into a meniscus shape having a concave surface facing the light deflector and satisfies $\phi_3/|\phi_2| \geq 10$ where $\phi_2$ is a refracting power of the second optical system in the sub-scanning direction and $\phi_3$ is a refracting power of the third optical system in the sub-scanning direction, an amount by which the optical axis of the second optical system is shifted in the sub-scanning direction is set to correct a deterioration in spot shape near an end portion of a scanning range on the scanned surface, two surfaces of a main scanning cross-section of the second optical system are formed into nonarcuated shapes, the second optical system comprises one lens, the third optical system comprises a cylindrical mirror, the third optical system comprises a cylindrical lens, or the system further comprises a bending mirror inserted in an optical path between the light source means and the light deflector.

An image forming apparatus of the present invention forms an image by using the above scanning optical system.

A scanning optical system of the present invention comprises:

a first optical system for shaping a light beam emitted from light source means to form a line image elongated in the same direction as a main scanning direction;

a light deflector which has a deflection surface near an imaging position of the first optical system and deflects/scans an incident light beam in the main scanning direction;

a second optical system for forming the light beam deflected by the light deflector into an image on a scanned surface in the main scanning direction; and a third optical system for forming the light beam deflected by the light deflector into an image on the scanned surface in a sub-scanning direction and setting the deflection surface of the light deflector and the scanned surface conjugate with each other, and is characterized in that at least part of the second optical system also has a function of the first optical system, the light beam guided by the first optical system is made to strike the light deflector at a predetermined angle with respect to a plane perpendicular to a rotation axis of the light deflector, and the optical axis of the second optical system is set to be parallel to a plane which includes an imaging point of the line image and is perpendicular to a rotation axis of the light deflector, and part of the optical axis of the second optical system is set to shift from a plane, which includes the imaging point of the line image and is perpendicular to the rotation axis of the light deflector, by a predetermined amount in the sub-scanning direction.

In addition, the scanning optical system of the present invention is characterized in that the light beam incident on the light deflector is incident from a substantially center in a deflection angle of the light deflector, the light beam emerging from the first optical system is incident on the light deflector with a width of the light beam exceeding a width of the deflection surface of the light deflector in the main scanning direction, the second optical system is located closer to the light deflector than a middle position in a distance from the light deflector to the scanned surface, the system satisfies $\phi_3/|\phi_2| \geq 10$ where $\phi_2$ is a refracting power of the second optical system in the sub-scanning direction and $\phi_3$ is a refracting power of the third optical system in the sub-scanning direction, an amount by which part of the optical axis of the second optical system is shifted in the sub-scanning direction is set to correct a deterioration in spot shape near an end portion of a scanning range on the scanned surface, the second optical system comprises at least two lenses, and an optical axis of at least the lens nearest to the scanned surface is shifted by a predetermined amount in the sub-scanning direction, the second optical system comprises at least two lenses, and at least the lens nearest to the scanned surface also has a function of the first optical system, a shape of a sub-scanning cross-section of the lens, of the second optical system, which is shifted by the predetermined amount in the sub-scanning direction is formed into a meniscus shape having a concave surface facing the light deflector, two surfaces of a sub-scanning cross-section of the lens, of the second optical system, which also has the function of the first optical system are formed into flat shapes, two surfaces of a main scanning cross-section of the lens, of the second optical system, which is shifted by the predetermined amount in the sub-scanning direction are formed into non-arcuated shapes, two surfaces of a main scanning cross-section of the lens, of the second optical system, which also has the function of the first optical system are formed into arcuated shapes having concave surfaces facing the light deflector, the third optical system comprises a cylindrical lens, or the system further comprises a bending mirror inserted in an optical path between the light source means and the light deflector.

An image forming apparatus of the present invention forms an image by using the above scanning optical system.

DETAILED DESCRIPTION OF THE PREFERRED EMBODIMENTS

Figure 1:
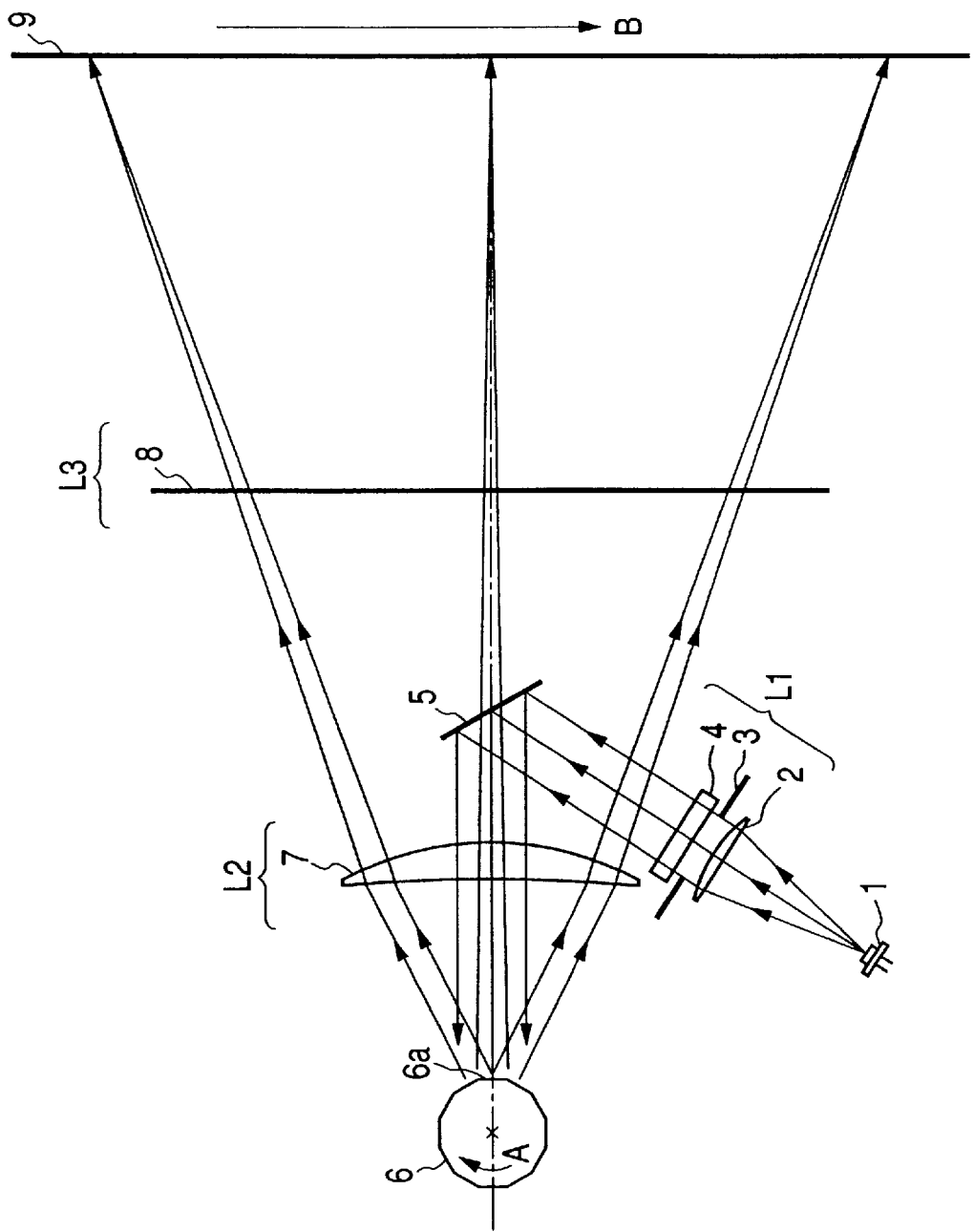
FIG. 1 is a sectional view showing the main part of the first embodiment of the present invention in the main scanning direction.
Figure 2:
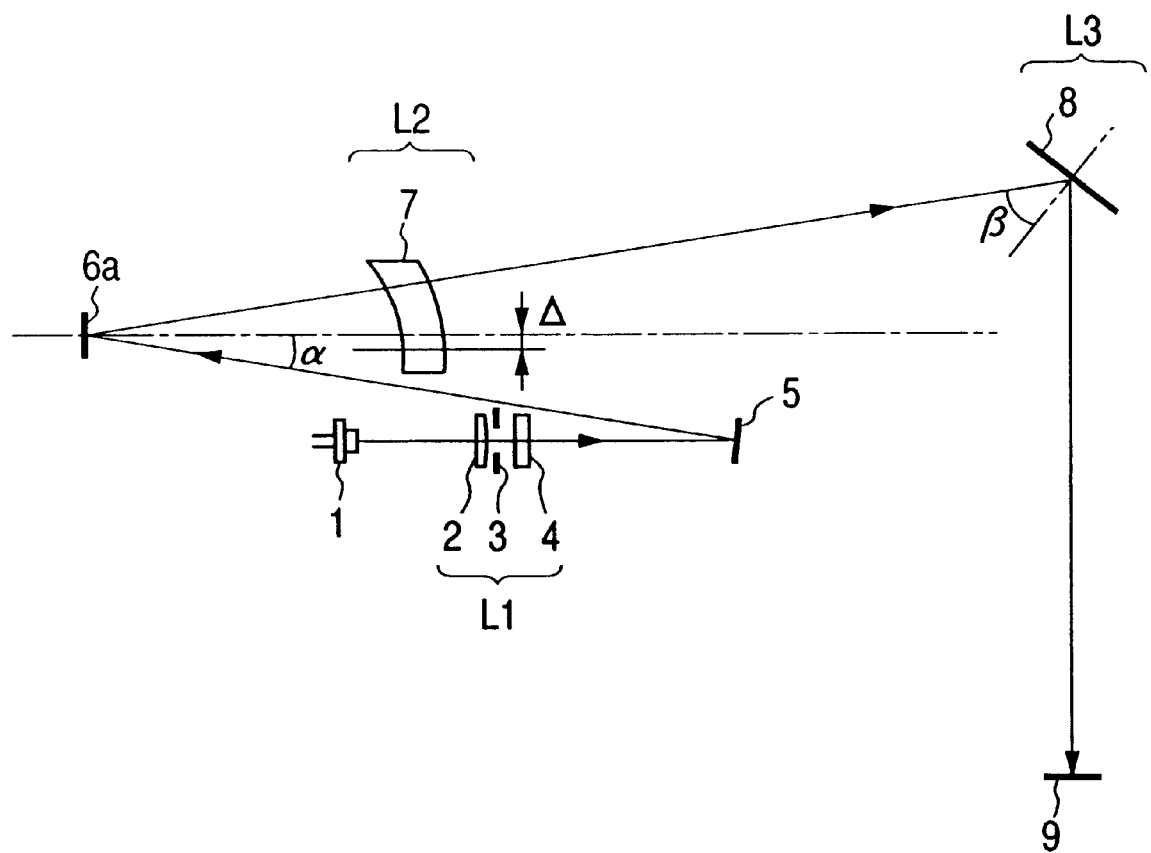
FIG. 2 is a sectional view showing the main part of the first embodiment of the present invention in the sub-scanning direction.

FIG. 1 is a sectional view showing the main part of an image forming apparatus such as a laser beam printer or digital copying machine, in the main scanning direction, to which an optical scanning system according to the first embodiment of the present invention is applied. FIG. 2 is a sectional view showing the main part of the image forming apparatus such as a laser beam printer or digital copying machine, in the sub-scanning direction, to which the optical scanning system according to the first embodiment of the present invention is applied.

Referring to FIGS. 1 and 2, as a light source means 1, for example, a semiconductor laser is used. A collimator lens 2 (conversion optical element) converts a divergent light beam emitted from the light source means 1 into a substantially collimated light beam. An aperture stop 3 limits the light beam that passes through it to shape its beam shape. A cylindrical lens 4 has a predetermined refracting power in the sub-scanning direction and forms the light beam that passes through the aperture stop 3 into a substantially line image (linear image) elongated in the main scanning direction within the sub-scanning cross-section on a deflection (reflection) surface 6a of a polygon mirror 6 as a light deflector (to be described later).

Note that each element such as the collimator lens 2, aperture stop 3, or cylindrical lens 4 is an element of a first optical system L1. These elements are displaced from the main scanning plane by predetermined amounts. In this embodiment, they are displaced on the upper and lower sides of the page.

A bending (folding) mirror 5 having a flat shape is disposed between the light source means 1 and the light deflector 6. The bending mirror 5 is displaced downward from the main scanning plane by a predetermined amount, like the first optical system L1, and the reflection surface of the bending mirror 5 is disposed obliquely upward. This arrangement makes the light beam having passed through the first optical system L1 hit the polygon mirror 6 at a right angle (substantially the center of the deflection angle of the polygon mirror 6, i.e., substantially the center in a scanning range along the main scanning direction) in the main scanning direction and also makes the light beam strike the polygon mirror 6 from obliquely below in the sub-scanning direction. In addition, this structure makes the light beam having passed through the first optical system L1 strike the deflection surface 6a of the polygon mirror 6 with the width of the light beam exceeding the width of the deflection surface 6a in the main scanning direction (so-called over field optical system).

Note that in this specification, the main scanning plane is a plane which includes the imaging point of the line image formed by the first optical system L1 and is perpendicular to the rotation axis of the polygon mirror 6.

The polygon mirror 6 serving as a light deflector is rotated by a driving means (not shown) such as a motor at a constant angular velocity in the direction indicated by an arrow A in FIG. 1 (main scanning direction).

A single scanning lens (fθ lens) 7 serves as a second optical system L2. The two surfaces of the scanning lens 7 in the main scanning cross-section are non-arcuated (aspherical), and the shape of a sub-scanning cross-section of the lens 7 is a meniscus shape having a concave surface facing the polygon mirror 6. In this embodiment, the scanning lens 7 is set (disposed) to make its optical axis become parallel with the main scanning plane, while the optical axis is located outside the main scanning plane and shifted therefrom in the sub-scanning direction by a predetermined amount (Δ). The scanning lens 7 forms the light beam deflected by the polygon mirror 6 at a constant angular velocity into an image on a scanned surface 9 mainly in the main scanning direction, and performs correction to make the light beam scan on the scanned surface 9 at a constant velocity.

A cylindrical mirror 8 serves as a third optical system L3 and has a power only in the sub-scanning direction without having any power in the main scanning direction. The cylindrical mirror 8 forms the light beam deflected by the polygon mirror 6 into an image on the scanned surface 9 mainly in the sub-scanning direction and sets the deflection surface 6a of the polygon mirror 6 and the scanned surface 9 almost optically conjugate with each other.

The scanned surface 9 is, for example, a photosensitive drum surface. When the polygon mirror 6 rotates at a constant angular velocity in the direction indicated by the arrow A in FIG. 1, and the light beam deflected/scanned by the deflection surface 6a of the polygon mirror 6 passes through the second and third optical systems L2 and L3, the light beam forms a spot on the scanned surface 9. This spot is scanned at a constant speed in the direction indicated by an arrow B in FIG. 1.

Figure 3A:
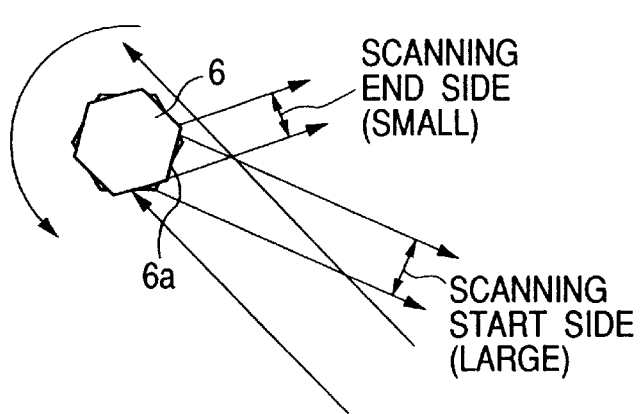
FIG. 3A is a view for explaining how light strikes a polygon mirror in an over field optical system.
Figure 3B:
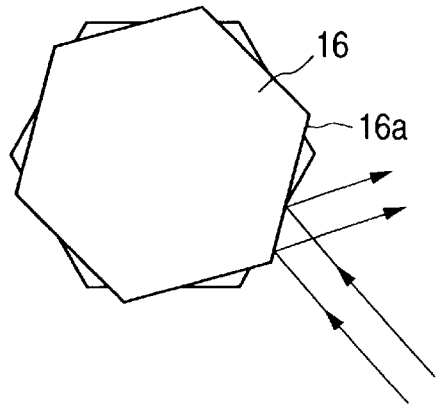
FIG. 3B is a view for explaining how light strikes a polygon or in an over field optical system.

FIGS. 3A and 3B are views for explaining how light beams emitted from light source means in an under field optical system and over field optical system strike deflection surfaces of the polygon mirrors.

As shown in FIG. 3A, in the scanning optical system in this embodiment, the light beam having passed through the first optical system L1 (not shown) is incident on the deflection surface 6a of the polygon mirror 6 with the width of the light beam exceeding the width of the deflection surface 6a (so-called over field optical system) in the main scanning direction.

In contrast to this, as shown in FIG. 3B, in the scanning optical system generally used in the prior art, the light beam having passed through a first optical system L1 (not shown) is incident on a deflection surface 16a of a polygon mirror 16 with the width of the light beam being smaller than the width of the deflection surface 16a in the main scanning direction (so-called under field optical system).

As is obvious from FIGS. 3A and 3B, assuming that the widths of light beams incident on the scanning lens in the two optical systems are the same, the over field optical system can use a smaller polygon mirror and set a larger number of deflection surfaces. This offers a great advantage in increasing the speed and resolution.

In the over field optical system, however, as shown in FIG. 3A, if a light beam strikes the polygon mirror 6 in the same direction as in the under field optical system, the widths of light beams incident on the scanning lens 7 in the main scanning direction become greatly asymmetric on the two end portions of the scanning range in the main scanning direction. As a consequence, the spot diameter on the scanning start side on the scanned surface greatly differs from that on the scanning end side in the main scanning direction, and the light amount also greatly changes.

In this embodiment, therefore, to suppress the above difference to an allowable level, a light beam is made to strike the polygon mirror 6 from substantially the center in the scanning range in the main scanning direction, as shown in FIG. 1. When the system uses such an incidence method, since the first optical system L1 as an incident optical system and the scanning optical system cannot be disposed in the same plane (main scanning plane), a light beam is sent to strike the polygon mirror 6 from below at a predetermined angle with respect to the main scanning plane.

Figure 4:
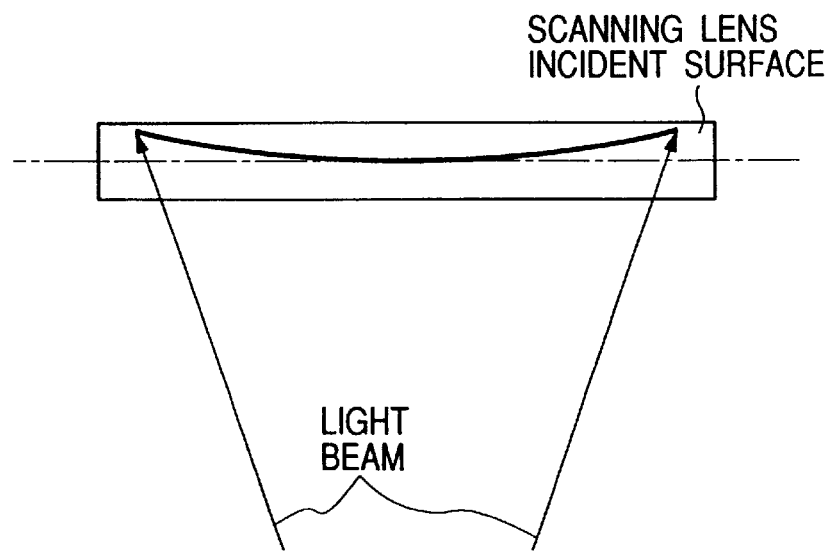
FIG. 4 is a view showing the locus of a light beam on a scanning lens in an oblique incident optical system.
Figure 11:
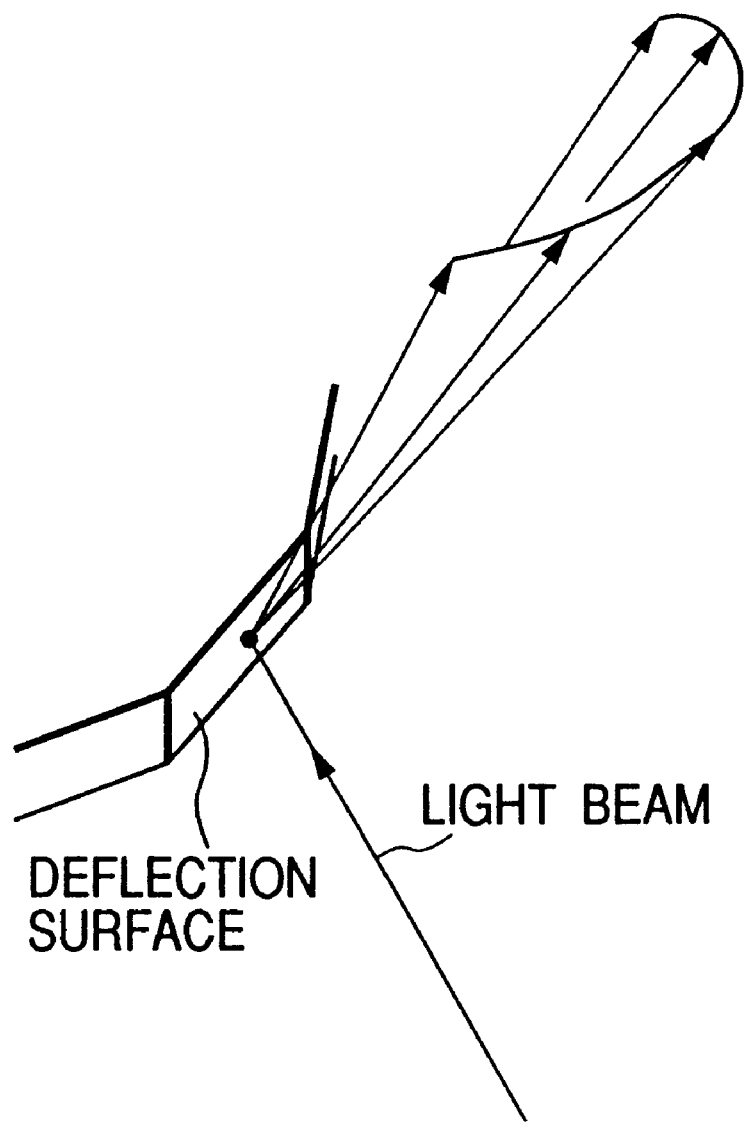
FIG. 11 is a view showing a surface formed by a scanned light beam in an oblique incident optical system.

In an optical system using this incidence method, i.e., a so-called oblique incident optical system, since the light beam deflectively reflected by the polygon mirror 6 forms a conical surface like the one shown in FIG. 11, the locus of the position where the light beam strikes the scanning lens 7 is arcuated in the sub-scanning direction as shown in FIG. 4, and the light beam is incident on the scanning lens 7 with a skew. For this reason, the aberration caused by the skew incidence adversely affects the spot shape and degrades it especially on an end portion of the scanning range in the main scanning direction. As a consequence, a desired spot diameter cannot be obtained.

In this embodiment, therefore, to solve the above problem, the scanning lens 7 as the second optical system L2 is disposed at a position closer to the polygon mirror 6 than the middle position in the distance from the polygon mirror 6 to the scanned surface 9, and the cylindrical mirror 8 as the third optical system L3 is disposed on the scanned surface 9 side.

In this embodiment, the scanning lens 7 as the second optical system L2 is a single lens, as described above, and the two surfaces of the lens 7 in the main scanning cross-section are non-arcuated (aspherical). The shape of a sub-scanning cross-section of the scanning lens 7 is a meniscus shape having a concave surface facing the polygon mirror 6. The refracting power of the scanning lens 7 is set to satisfy $$\phi_3/|\phi_2| \geq 10 \tag{1}$$

where $\phi_2$ is the refracting power of the second optical system L2 in the sub-scanning direction and $\phi_3$ is the refracting power of the third optical system L3 in the sub-scanning direction. The optical axis of the scanning lens 7 is parallel to the main scanning plane. This optical axis is located outside the main scanning plane and is shifted therefrom by a predetermined amount ($\Delta$) in the sub-scanning direction.

As described above, the cylindrical mirror 8 as the third optical system L3 in this embodiment has no power in the main scanning direction but has a power in the sub-scanning direction.

In the oblique incident optical system, it is not preferable to set the optical axis of the scanning lens 7 parallel with the principal ray of the light beam deflected/reflected by the polygon mirror 6. It is especially undesirable to insert a scanning lens 7 having a power in the main scanning direction in the above manner. If a scanning lens 7 having a power in the main scanning direction is disposed in the above manner, marginal rays of the light beam incident on the scanning lens 7, located on the two sides in the main scanning direction, are refracted in the sub-scanning direction as well on an end portion of the scanning range, and the refraction angles differ from each other, resulting in a deterioration in spot shape.

If the optical axis of the scanning lens 7 is set to be parallel to the main scanning plane, the difference (in the sub-scanning direction) between the refraction angles of the marginal rays of the light beam incident on the scanning lens 7 on the two end portions of the scanning range in the main scanning direction is small, and hence the influence of this angle difference on the spot shape is relatively small.

In this embodiment, therefore, the optical axis of the scanning lens 7 having a power in the main scanning direction is set to be parallel with the main scanning plane so as to suppress any deterioration in spot shape at an end portion of the scanning range to a relatively low level.

In addition, to actively correct the above deterioration in spot shape, in this embodiment, a sub-scanning cross-section of the scanning lens 7 is formed into a meniscus shape having a concave surface facing the polygon mirror 6 and exhibiting a weak refracting power, and the optical axis of the lens 7 is shifted from the main scanning plane by a predetermined amount (Δ) in the sub-scanning direction. The aberration caused by skew incidence of light on the scanning lens 7 can be effectively corrected by shifting the scanning lens 7 in the sub-scanning direction. If, however, the scanning lens 7 having a strong power in the sub-scanning direction is shifted in this manner, asymmetrical comatic aberration tends to occur in the sub-scanning direction. In this case, therefore, a sufficient correcting effect cannot be obtained. Assume that a sub-scanning cross-section of the scanning lens 7 is made flat to have no power in the sub-scanning direction in order to solve this problem. In this case, shifting the scanning lens 7 is equivalent to shifting a plane-parallel plate in the sub-scanning direction, and hence no effect can be expected.

In this embodiment, therefore, a sub-scanning cross-section of the scanning lens 7 is formed into a meniscus shape having a concave surface facing the polygon mirror 6 and exhibiting a weak refracting power to set the refracting power that satisfies relation (1) given above. With this lens shape, the asymmetrical comatic aberration caused in the sub-scanning direction when the scanning lens 7 is shifted in the sub-scanning direction can be suppressed. In addition, the aberration caused by skew incidence of light on the scanning lens 7 can be effectively corrected by making sub-scanning cross-sections of the two surfaces of the lens 7 have curvatures.

Furthermore, in this embodiment, the scanning lens 7 is disposed at a position closer to the polygon mirror 6 than the middle position in the distance from the polygon mirror 6 to the scanned surface 9. This arrangement can suppress the bending amount of the locus of the position where a light beam strikes the scanning lens 7 in FIG. 4 to a small amount, thereby effectively correcting the aberration caused by skew incidence of light.

In this embodiment, the cylindrical mirror 8 is used as the third optical system L3. However, the present invention is not limited to this. For example, this mirror may be replaced with a cylindrical lens.

Table 1 shows an optical configuration in the this embodiment, the aspherical coefficients of the scanning lens, and values based on relation (1).

TABLE 1

| Wavelength Used | λ (nm) | 780 |
|---|---|---|
| Distance between Light Source and First Surface of Collimator lens | d0 | 118.94 |
| Thickness of Collimator Lens | d1 | 2 |
| Distance between Second Surface of Collimator lens and First Surface of Cylindrical Lens | d2 | 13 |
| Thickness of Cylindrical Lens | d3 | 5 |
| Distance between Second Surface of Cylindrical lend and Polygon Surface | d4 | 231.65 |
| Distance between Polygon Surface and First Surface of Scanning Lens | d5 | 82.02 |
| Thickness of Scanning Lens | d6 | 12.51 |
| Distance between Second Surface of Scanning lens and Cylindrical Mirror | d7 | 142.82 |
| Distance between Cylindrical Mirror and Scanned Surface | d8 | 197.88 |
| Refractive Index of Collimator Lens | Ncol | 1.76203 |
| Refractive Index of Cylindrical Lens | Ncyl | 1.51072 |
| Refractive Index of Scanning Lens | Nfθ | 1.52420 |
| Radius of Curvature of First Surface of Collimator Lens | R1col | 0.000 |
| Radius of Curvature of Second Surface of Collimator Lens | R2col | −91.500 |
| Radius of Curvature of First Surface of Cylindrical Lens (Main Scanning) | R1cyl(m) | 0.000 |

TABLE 1-continued

| Radius of Curvature of First Surface of Cylindrical Lens (Sub-scanning) | R1cyl(s) | 120.000 |
|---|---|---|
| Radius of Curvature of Second Surface of Cylindrical lens | R2cyl | 0.000 |
| Radius of Curvature of Cylindrical mirror in Sub-scanning Direction | Rclm(s) | 303.537 |
| Shifting Amount of Scanning Lens | Δ | −5.23 |
| Polygon Surface Incident Angle in Sub-scanning Direction | α | 2 |
| Incident Angle of Light Beam on Cylindrical Mirror in Sub-Scanning Direction | β | 44 |
| Polygon Surface Maximum Exit Angle | θmax | 27 |
| Polygon Surface | θ40 12 surfaces | |
| Aperture Stop | 4.45 in Sub-Scanning Direction | |

| Scanning Lens | | | | |
|---|---|---|---|---|
| First Surface | | Second Surface | | |
| R | −841.242 | R | −147.306 | φ3/\|φ2\| |
| K | 3.380E+01 | K | −1.242E+01 | 34.617 |
| B4 | −1.198E−07 | B4u | −5.716E−07 | |
| B6 | 5.118E−11 | B6u | 1.278E−10 | |
| B8 | −1.410E−14 | B8u | −2.617E−14 | |
| B10 | 1.793E−18 | B10u | 2.639E−18 | |
| r | −98.000 | r | −97.478 | |
| D2 | −2.065E−05 | D2 | 0.000E+00 | |
| D4 | 3.984E−09 | D4 | 0.000E+00 | |
| D6 | −1.267E−12 | D6 | 0.000E+00 | |
| D8 | −8.917E−17 | D8 | 0.000E+00 | |
| D10 | 0.000E+00 | D10 | 0.000E+00 | |

If the intersection between each lens surface and the optical axis is regarded as an origin, and the optical axis direction, the direction perpendicular to the optical axis within the main scanning cross-section, and the direction perpendicular to the optical axis within the sub-scanning cross-section respectively correspond to the X-axis, the Y-axis, and the Z-axis, the aspherical shape of a main scanning cross-section of the scanning lens 7 can be expressed as:

$$X = \frac{Y^2/R}{1 + (1 - (1+K)(Y/R)^2)^{1/2}} + B_4 Y^4 + B_6 Y^6 + B_8 Y^8 + B_{10} Y^{10}$$

where R is the radius of curvature, and k and $B_4$ to $B_{10}$ are aspherical coefficients.

Also if the lens surface coordinates in the main scanning direction are represented by Y, a radius of curvature r' of the shape of a sub-scanning cross-section of the scanning lens 7 is expressed as:

$$r' = r(1 + D_2 Y^2 + D_4 Y^4 + D_6 Y^6 + D_8 Y^8 + D_{10} Y^{10})$$

where r is the radius of curvature on the optical axis, and $D_2$ to $D_{10}$ are aspherical coefficients.

Figure 5:
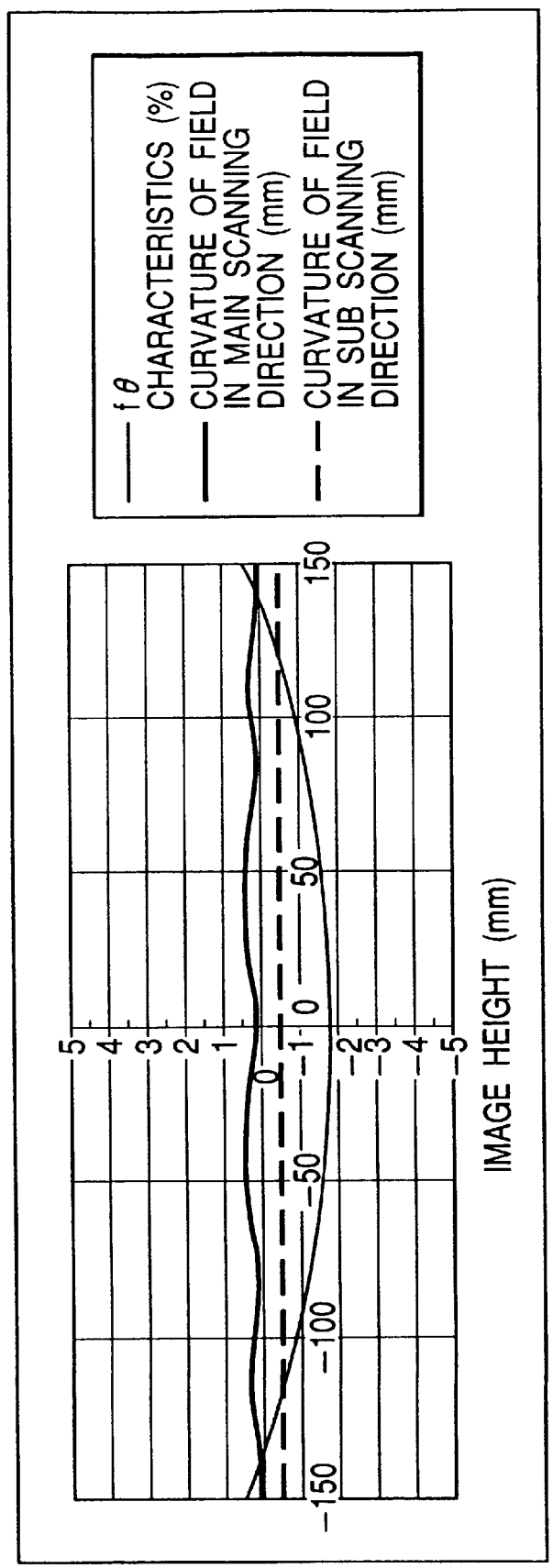
FIG. 5 is a graph showing aberrations in the first embodiment of the present invention.

FIG. 5 is a graph showing the curvature of field of the scanning optical system of this embodiment in the main scanning direction and sub-scanning direction and the fθ characteristics of the system.

Figure 6:
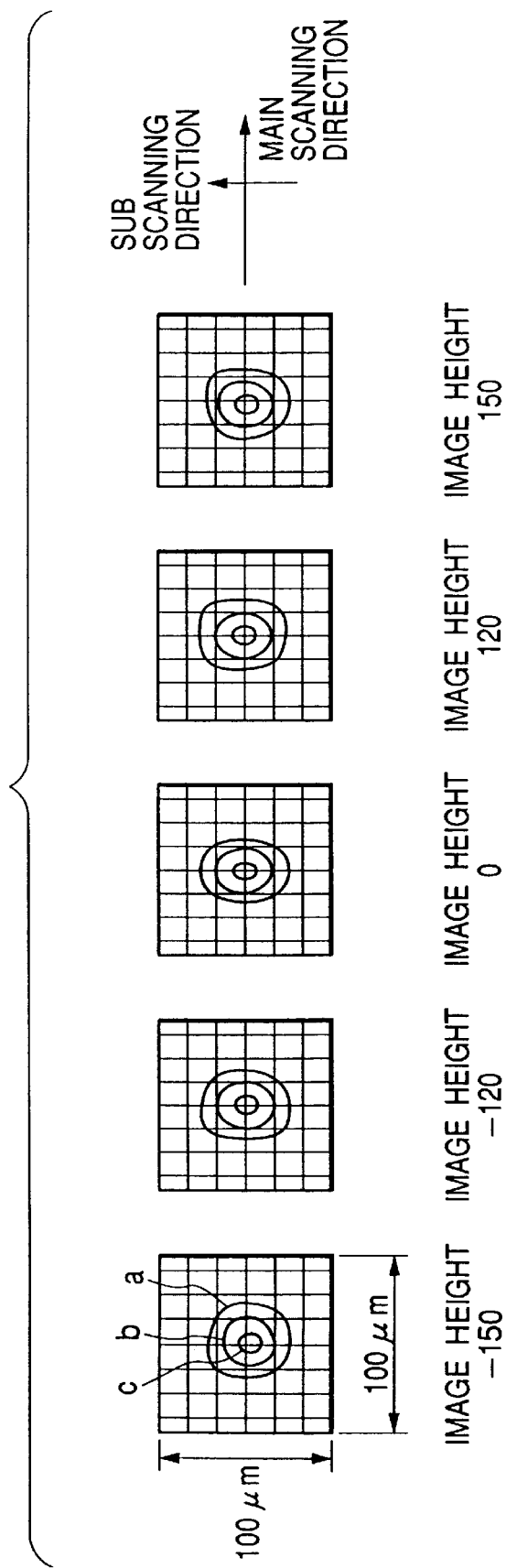
FIG. 6 is a view showing the spot shapes in the first embodiment of the present invention.

FIG. 6 is a view for explaining the spot shapes on the scanned surface of the scanning optical system of this embodiment. Referring to FIG. 6, an outermost line a indicates the spot shape sliced at $1/e^2$ of the peak intensity, and second and third lines b and c respectively indicate the spot shapes sliced at 50% and 90% of the peak intensity.

As evidenced by FIG. 6, by setting the scanning optical system as in this embodiment, a deterioration in spot shape due to skew incidence of light can be effectively corrected while each aberration is properly corrected.

Figure 7:
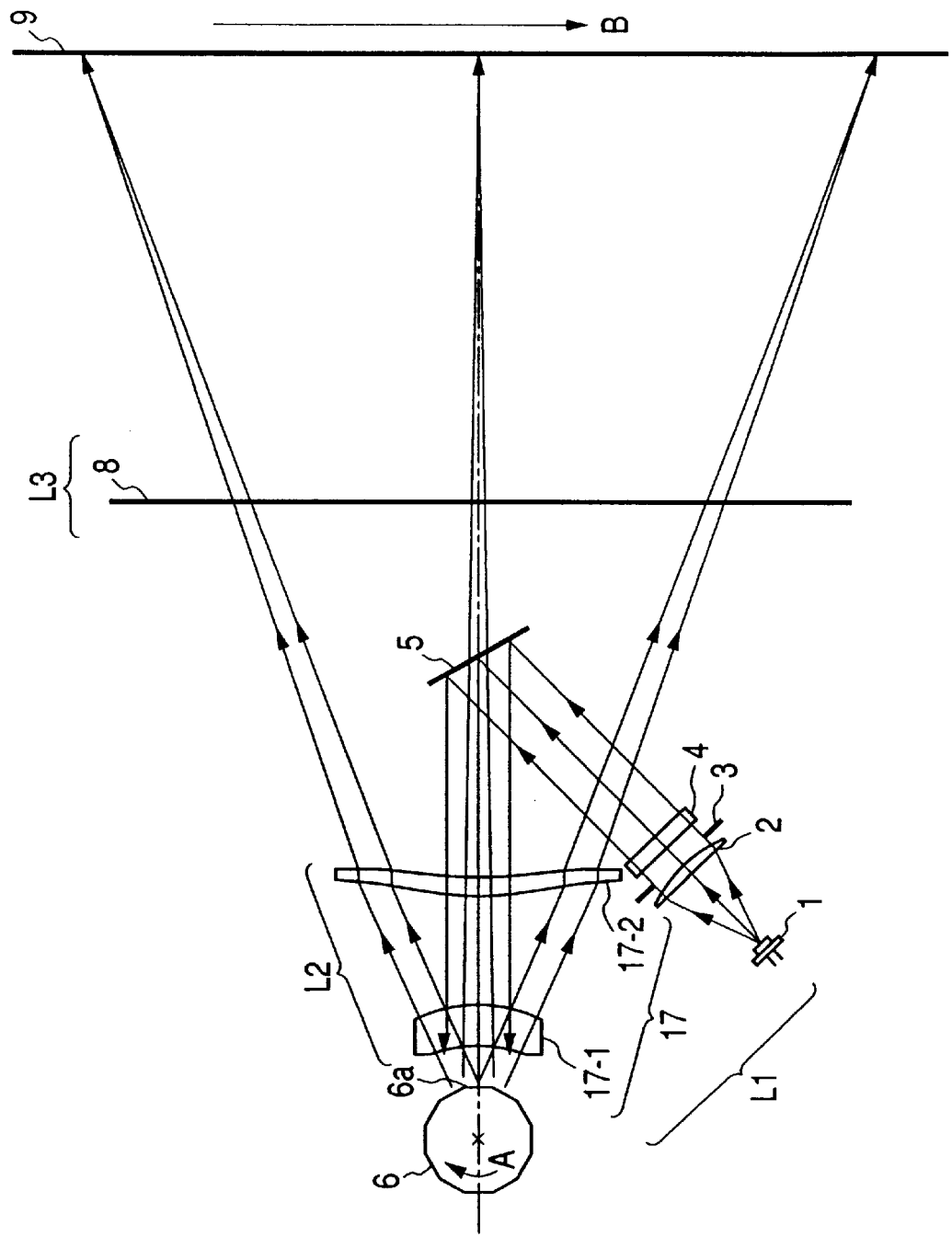
FIG. 7 is a sectional view showing the main part of the second embodiment of the present invention in the main scanning direction.
Figure 8:
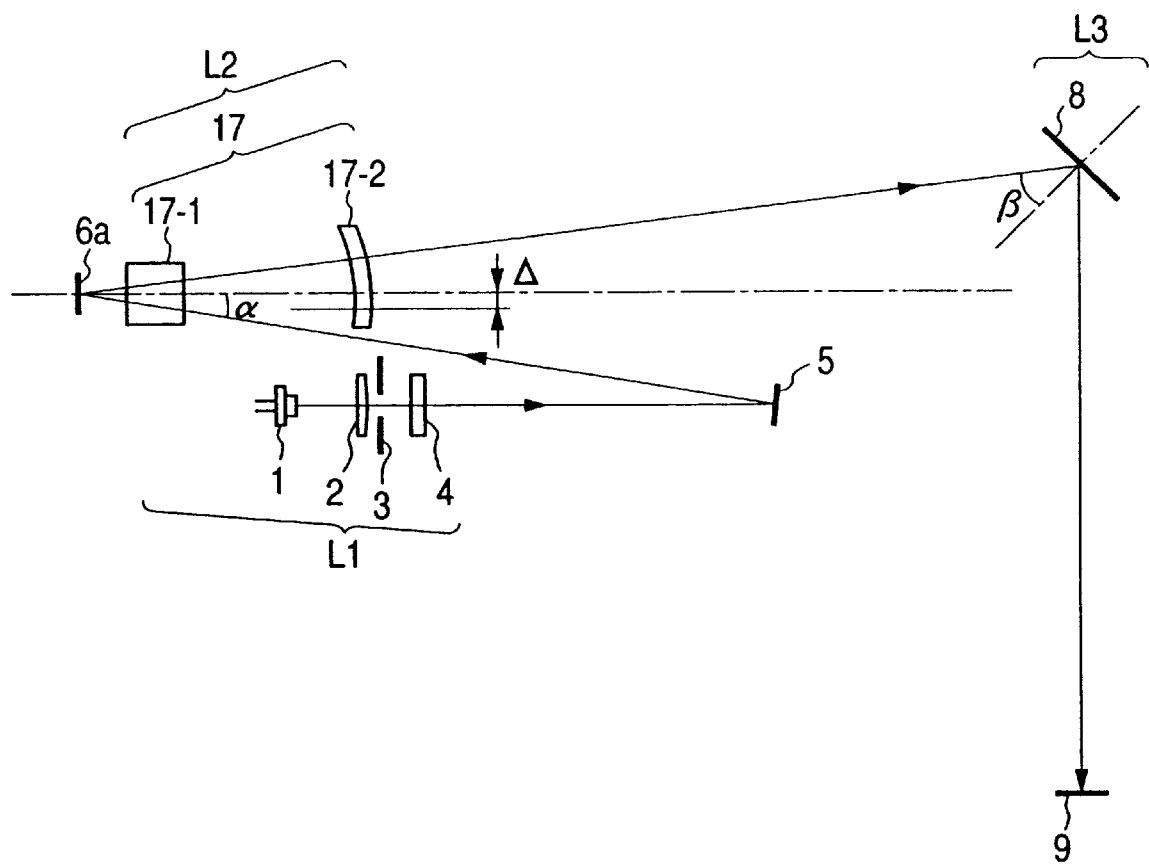
FIG. 8 is a sectional view showing the main part of the second embodiment of the present invention in the sub-scanning direction.

FIG. 7 is a sectional view showing the main part of an image forming apparatus such as a laser beam printer or digital copying machine, in the main scanning direction, to which an optical scanning system according to the second embodiment of the present invention is applied. FIG. 8 is a sectional view showing the main part of the image forming apparatus such as a laser beam printer or digital copying machine, in the sub-scanning direction, to which the optical scanning system according to the second embodiment of the present invention is applied. The same reference numerals in FIGS. 7 and 8 denote the same parts as in FIGS. 1 and 2.

This embodiment differs from the first embodiment in that a scanning lens serving as a second optical system L2 is made up of two lenses, and one of the lenses building the second optical system L2 also has the function of a first optical system L1. The arrangement other than this and optical effects of the second embodiment are almost the same as those of the first embodiment, and hence similar effects are obtained.

Referring to FIGS. 7 and 8, a scanning lens 17 serves as a second optical system L2 and is made up of two lenses, i.e., a first scanning lens 17-1 and second scanning lens 17-2 disposed in this order from the polygon mirror 6 side. The scanning lens 17 is located closer to the polygon mirror 6 side than the middle position in the distance from the polygon mirror 6 to a scanned surface 9.

The two surfaces of a main scanning cross-section of first scanning lens 17-1 disposed on the polygon mirror 6 side are formed into arcuated shapes having concave surfaces facing the polygon mirror 6 and having positive powers. The two surfaces of a sub-scanning cross-section of the first scanning lens 17-1 are shaped to have an infinite radius of curvature (i.e., flat shapes). The optical axis of the first scanning lens 17-1 is set to be parallel to the main scanning plane. In addition, the first scanning lens 17-1 builds the first optical system L1 as an incident optical system, together with a conversion optical element (collimator lens) 2, an aperture stop 3, and a cylindrical lens 4.

In this embodiment, the divergent light beam emitted from a light source means 1 is converted into a weakly divergent light beam by the conversion optical element 2. The beam shape is shaped by the aperture stop 3. The light beam is then refracted by the cylindrical lens 4 only in the sub-scanning direction. Thereafter, the light beam is converted into a substantially collimated light beam by the first scanning lens 17-1 in the main scanning direction to form an almost linear image (line image) on a deflection surface 6a of the polygon mirror 6 (so-called double path optical system). With this arrangement, the collimator lens 2, cylindrical lens 4, and the like can be reduced in size.

In this embodiment, the two surfaces of a sub-scanning cross-section of the first scanning lens 17-1 are formed into flat shapes to suppress occurrence of aberration due to skew incidence of light.

As in the first embodiment, the shape of a sub-scanning cross-section of the second scanning lens 17-2 disposed on the scanned surface 9 side is a meniscus shape having a concave surface facing the polygon mirror 6 and exhibiting no power, and the optical axis of the second scanning lens 17-2 is set to be parallel to the main scanning plane, and shifted from the main scanning plane by a predetermined amount ($\Delta$) in the sub-scanning direction. Furthermore, the refracting power of the second scanning lens 17-2 is set to satisfy $$\phi_3/|\phi_2| \geq 10 \qquad (2)$$

where $\phi_2$ is the refracting power of the second optical system L2 in the sub-scanning direction and $\phi_3$ is the refracting power of a third optical system L3 in the sub-scanning direction. With this arrangement, the aberration caused by skew incidence of light can be effectively corrected, and an excellent spot shape can be obtained.

The two surfaces of a main scanning cross-section of the second scanning lens 17-2 in this embodiment have nonarcuated shape (aspherical surfaces). A lens using such aspherical surfaces is preferably manufactured by plastic molding in consideration of cost and productivity.

Plastic materials, however, undergo large focus shifts due to environmental variations, and more specifically, ambient temperature variations. For this reason, it is not preferable that the second scanning lens 17-2 have the function of the first optical system L1 as an incident optical system. In this embodiment, only the first scanning lens 17-1 having a simple shape, which can be manufactured by using a glass material, is made to also have the function of the first optical system L1, thereby realizing a scanning optical system that is resistant to environmental variations.

In this embodiment, a cylindrical mirror 8 is used as the third optical system L3. However, the present invention is not limited to this. For example, the cylindrical mirror 8 may be replaced with a cylindrical lens.

Table 2 shows an optical configuration in the this embodiment, the surface coefficients of the first scanning lens, the aspherical coefficients of the second scanning lens, and values based on relation (2). R, k, $B_4$ to $B_{10}$, r, and $D_2$ to $D_{10}$ in Table 2 are equivalent to the coefficients in Table 1.

TABLE 2

| Wavelength Used | λ (nm) | 780 |
|---|---|---|
| Distance between Light Source and First Surface of Collimator lens | d0 | 52.66 |
| Thickness of Collimator Lens | d1 | 2 |
| Distance between Second Surface of Collimator Lens and First Surface of Cylindrical Lens | d2 | 15 |
| Thickness of Cylindrical Lens | d3 | 5 |
| Distance between Second Surface of Cylindrical Lens and Polygon Surface | d4 | 268.00 |
| Distance between Polygon Surface and First Surface of Scanning Lens | d5 | 16.00 |
| Thickness of First Scanning Lens | d6 | 17.00 |
| Distance between Second Surface of First Scanning Lens and First Surface of Second Scanning lens | d7 | 45.10 |
| Thickness of Second Scanning Lens | d8 | 8.00 |
| Distance between Second Surface of Second Scanning Lens and Cylindrical Mirror | d9 | 151.24 |
| Distance between Cylindrical Mirror and Scanned Surface | d10 | 183.00 |
| Refractive Index of Collimator Lens | Ncol | 1.76203 |
| Refractive Index of Cylindrical Lens | Ncyl | 1.51072 |
| Refractive Index of First Scanning Lens | Nfθ1 | 1.51072 |
| Refractive Index of Second Scanning Lens | Nfθ2 | 1.52420 |
| Radius of Curvature of First Surface of Collimator Lens | R1col | 0.000 |
| Radius of Curvature of Second Surface of Collimator Lens | R2col | −45.000 |
| Radius of Curvature of First Surface of Cylindrical Lens (Main Scanning) | R1cyl(m) | 0.000 |
| Radius of Curvature of First Surface of Cylindrical Lens (Sub-scanning) | R1cyl(s) | 95.100 |
| Radius of Curvature of Second Surface of Cylindrical Lens | R2cyl | 0.000 |
| Radius of Curvature of Cylindrical mirror in Sub-scanning Direction | Rclm(s) | 285.724 |
| Shifting Amount of Second Scanning Lens | Δ | −4.34 |
| Polygon Surface Incident Angle in Sub-scanning | α | 2 |

TABLE 2-continued

| Direction | | | | |
|---|---|---|---|---|
| Incident Angle of Light Beam on Cylindrical Mirror β in Sub-Scanning Direction | | | | 44 |
| Polygon Surface Maximum Exit Angte | | | θmax | 27 |
| Polygon Surface | φ40 12 surfaces | | | |
| Aperture Stop | 5.14 in Sub-Scanning Direction | | | |

| First Scanning Lens | | | | | |
|---|---|---|---|---|---|
| First Surface | | Second Surface | | | |
| R | −57.481 | R | −55.220 | φ3/\|φ2\| | |
| r | 0.000 | r | 0.000 | 67.552 | |

| Second Scanning Lens | | | |
|---|---|---|---|
| First Surface | | Second Surface | |
| R | 173.409 | R | 387.488 |
| K | −1.324E+01 | K | −2.841E+01 |
| B4 | 6.258E−08 | B4u | −1.282E−07 |
| B6 | −4.292E−12 | B6u | 3.429E−11 |
| B8 | −1.478E−14 | B8u | −1.936E−14 |
| B10 | 6.906E−19 | B10u | 5.844E−19 |
| r | −98.391 | r | −98.478 |
| D2 | −7.124E−07 | D2 | 4.970E−05 |
| D4 | −1.727E−08 | D4 | −2.322E−08 |
| D6 | 6.301E−13 | D6 | −5.760E−13 |
| D8 | −4.775E−18 | D8 | 4.358E−16 |
| D10 | −6.944E−21 | D10 | −4.409E−20 |

Figure 9:
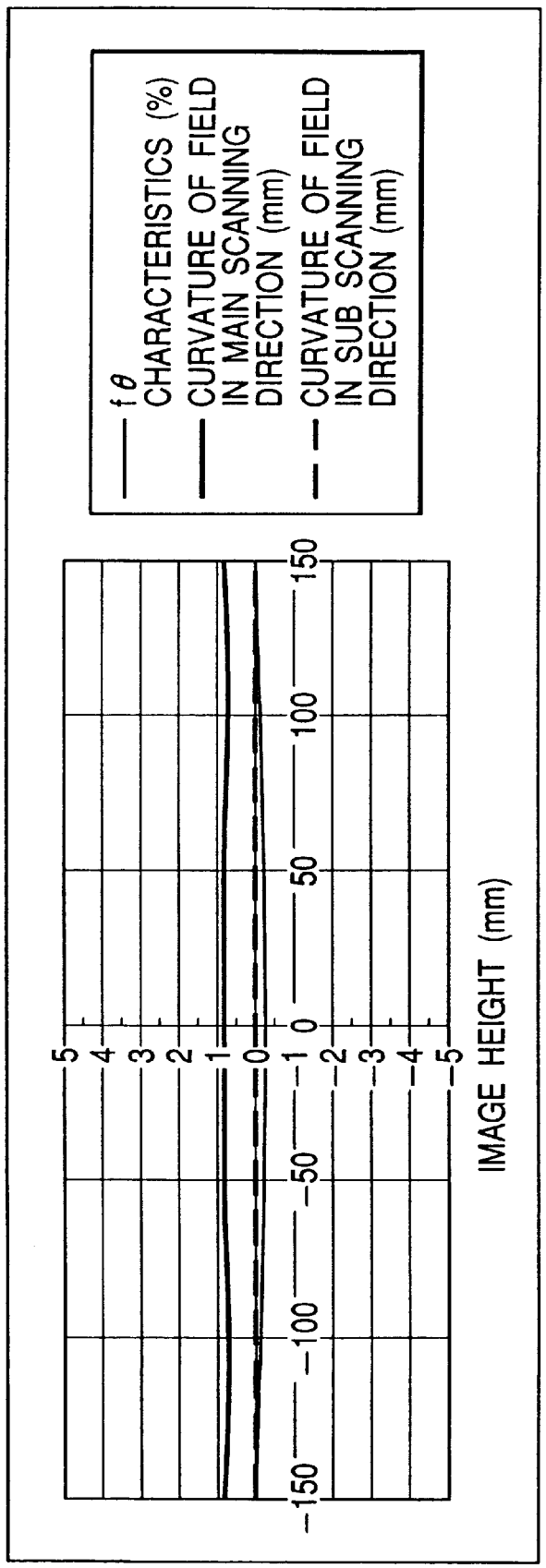
FIG. 9 is a graph showing aberrations in the second embodiment of the present invention.

FIG. 9 is a graph showing the curvature of field of the scanning optical system of this embodiment in the main scanning direction and sub-scanning direction and the fθ characteristics of the system.

Figure 10:
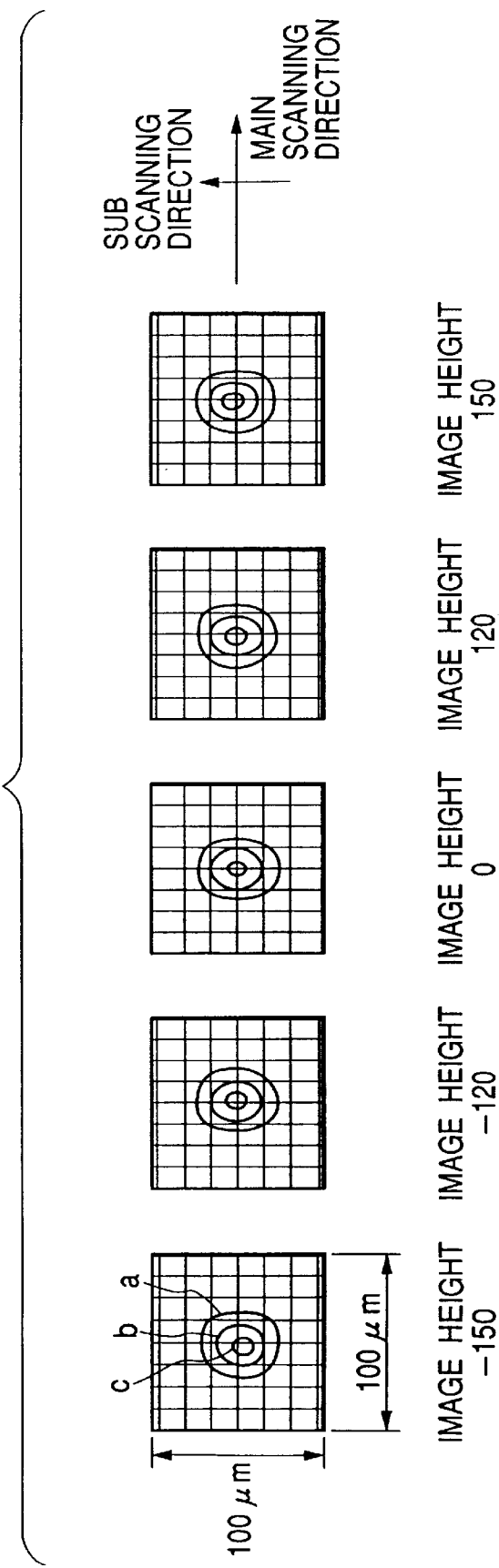
FIG. 10 is a view showing the spot shapes in the second embodiment of the present invention.

FIG. 10 is a view for explaining the spot shapes on the scanned surface of the scanning optical system of this embodiment. Referring to FIG. 10, an outermost line a indicates the spot shape sliced at $1/e^2$ of the peak intensity, and second and third lines b and c respectively indicate the spot shapes sliced at 50% and 90% of the peak intensity.

As is obvious from FIG. 10, by setting the scanning optical system as in this embodiment, a deterioration in spot shape due to skew incidence of light can be effectively corrected while each aberration is properly corrected.

According to the present invention, by optimally setting the shapes, configuration, and the like of the elements building the scanning optical system, a deterioration in spot shape caused in the sub-scanning incident optical system can be effectively corrected, thus realizing a scanning optical system in which both fθ characteristics and curvature of field can be properly corrected.

What is claimed is:

1. A scanning optical system comprising:

a first optical system for shaping a light beam emitted from light source means to form a line image elongated in the same direction as a main scanning direction;

a light deflector which has a deflection surface near an imaging position of said first optical system and deflectively scans an incident light beam in the main scanning direction;

a second optical system for forming the light beam deflected by said light deflector into an image on a scanned surface in the main scanning direction; and a third optical system for forming the light beam deflected by said light deflector into an image on the scanned surface in a sub-scanning direction and setting the deflection surface of said light deflector and the scanned surface optically conjugate with each other, wherein the light beam guided by said first optical system is made to strike said light deflector at a predetermined angle with respect to a plane perpendicular to a rotation axis of said light deflector, and an optical axis of said second optical system is set to be parallel to a plane which includes an imaging point of the line image and is perpendicular to the rotation axis of said light deflector, and is also set to shift from a plane, which includes the imaging point of the line image and is perpendicular to the rotation axis of said light deflector, by a predetermined amount in the sub-scanning direction.

2. A system according to claim 1, wherein the light beam incident on said light deflector is incident from a substantially center in a deflection angle of said light deflector.

3. A system according to claim 1, wherein the light beam emerging from said first optical system is incident on said light deflector with a width of the light beam exceeding a width of the deflection surface of said light deflector in the main scanning direction.

4. A system according to claim 1, wherein said second optical system is located closer to said light deflector than a middle position in a distance from said light deflector to the scanned surface.

5. A system according to claim 1, wherein a shape of a sub-scanning cross-section of said second optical system is formed into a meniscus shape having a concave surface facing said light deflector and satisfies $\phi_3/|\phi_2| \geq 10$ where $\phi_2$ is a refracting power of said second optical system in the sub-scanning direction and $\phi_3$ is a refracting power of said third optical system in the sub-scanning direction.

6. A system according to claim 1, wherein an amount by which the optical axis of said second optical system is shifted in the sub-scanning direction is set to correct a deterioration in spot shape near an end portion of a scanning range on the scanned surface.

7. A system according to claim 1, wherein two surfaces of a main scanning cross-section of said second optical system are formed into non-arcuated shapes.

8. A system according to claim 1, wherein said second optical system comprises one lens.

9. A system according to claim 1, wherein said third optical system comprises a cylindrical mirror.

10. A system according to claim 1, wherein said third optical system comprises a cylindrical lens.

11. A system according to claim 1, further comprising a bending mirror inserted in an optical path between said light source means and said light deflector.

12. A system according to claim 1, wherein said scanning optical system is used for an image forming apparatus for forming an image by using a deflected/scanned light beam.

13. A scanning optical system comprising:

a first optical system for shaping a light beam emitted from light source means to form a line image elongated in the same direction as a main scanning direction;

a light deflector which has a deflection surface near an imaging position of said first optical system and deflects/scans an incident light beam in the main scanning direction;

a second optical system for forming the light beam deflected by said light deflector into an image on a scanned surface in the main scanning direction; and a third optical system for forming the light beam deflected by said light deflector into an image on the scanned surface in a sub-scanning direction and setting the deflection surface of said light deflector and the scanned surface conjugate with each other, wherein at least part of said second optical system also has the function of said first optical system, the light beam guided by said first optical system is made to strike said light deflector at a predetermined angle with respect to a plane perpendicular to a rotation axis of said light deflector, and the optical axis of said second optical system is set to be parallel to a plane which includes an imaging point of the line image and is perpendicular to a rotation axis of said light deflector, and part of the optical axis of said second optical system is set to shift from a plane, which includes the imaging point of the line image and is perpendicular to the rotation axis of said light deflector, by a predetermined amount in the sub-scanning direction.

14. A system according to claim 13, wherein the light beam incident on said light deflector is incident from a substantially center in a deflection angle of said light deflector.

15. A system according to claim 13, wherein the light beam emerging from said first optical system is incident on said light deflector with a width of the light beam exceeding a width of the deflection surface of said light deflector in the main scanning direction.

16. A system according to claim 13, wherein said second optical system is located closer to said light deflector than a middle position in a distance from said light deflector to the scanned surface.

17. A system according to claim 13, wherein said system satisfies $$\phi_3/|\phi_2| \geq 10$$

where $\phi_2$ is a refracting power of said second optical system in the sub-scanning direction and $\phi_3$ is a refracting power of said third optical system in the sub-scanning direction.

18. A system according to claim 13, wherein an amount by which part of the optical axis of said second optical system is shifted in the sub-scanning direction is set to correct a deterioration in spot shape near an end portion of a scanning range on the scanned surface.

19. A system according to claim 13, wherein said second optical system comprises at least two lenses, and an optical axis of at least the lens nearest to the scanned surface is shifted by a predetermined amount in the sub-scanning direction.

20. A system according to claim 13, wherein said second optical system comprises at least two lenses, and at least the lens furthest to the scanned surface also has the function of said first optical system.

21. A system according to claim 13, wherein a shape of a sub-scanning cross-section of the lens, of said second optical system, which is shifted by the predetermined amount in the sub-scanning direction is formed into a meniscus shape having a concave surface facing said light deflector.

22. A system according to claim 13, wherein two surfaces of a sub-scanning cross-section of the lens, of said second optical system, which also has the function of said first optical system are formed into flat shapes.

23. A system according to claim 13, wherein two surfaces of a main scanning cross-section of the lens, of said second optical system, which is shifted by the predetermined amount in the sub-scanning direction are formed into non-arcuated shapes.

24. A system according to claim 13, wherein two surfaces of a main scanning cross-section of the lens, of said second optical system, which also has the function of said first optical system are formed into arcuated shapes having concave surfaces facing said light deflector.

25. A system according to claim 13, wherein said third optical system comprises a cylindrical mirror.

26. A system according to claim 13, wherein said third optical system comprises a cylindrical lens.

27. A system according to claim 13, further comprising a bending mirror inserted in an optical path between said light source means and said light deflector.

28. A system according to claim 13, wherein said scanning optical system is used for an image forming apparatus for forming an image by using a deflected/scanned light beam.

* * * * *

UNITED STATES PATENT AND TRADEMARK OFFICE
CERTIFICATE OF CORRECTION

PATENT NO.    : 6,239,894 B1
DATED         : May 29, 2001
INVENTOR(S)   : Yoshihiro Ishibe It is certified that error appears in the above-identified patent and that said Letters Patent is hereby corrected as shown below:

Title page,
Item [56], References Cited – Foreign Patent Documents:
"6018800A * 1/1994 (JP)." should be deleted; and "7027991A * 1/1995 (JP)."

Column 1,
Line 15, "Art Various" should read -- Art ¶ Various" --.
Line 37, "mirror).)" should read -- mirror). --.
Line 60, "it" should be deleted.

Column 2,
Line 63, "descried" should read -- described --.

Column 5,
Line 41, "or" should read -- mirror --.

Column 9,
Table 1, "lend and Polygon Surface" should read -- lens and Polygon Surface --.

Column 12,
Line 9, "nonar-" should read -- non-ar- --.

Column 13,
Table 2, "Polygon Surface Maximum Exit Angte" should read -- Polygon Surface Maximum Exit Angle --.

Column 16,
Line 9, "furthest" should read -- nearest --.

Signed and Sealed this

Eighteenth Day of June, 2002

Attest:

JAMES E. ROGAN
*Attesting Officer*     *Director of the United States Patent and Trademark Office*